Nov. 23, 1965  J. A. PETRIE  3,219,314
BLADE ASSEMBLIES FOR FLUID FLOW MACHINES
Filed Feb. 16, 1965
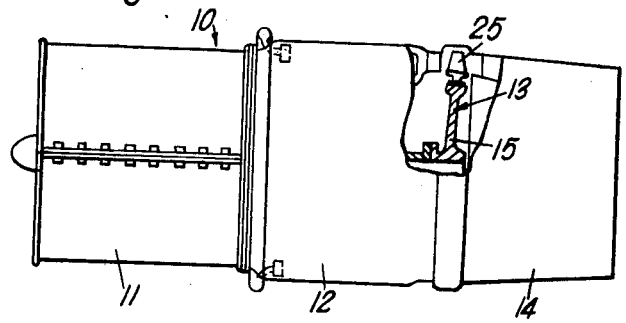
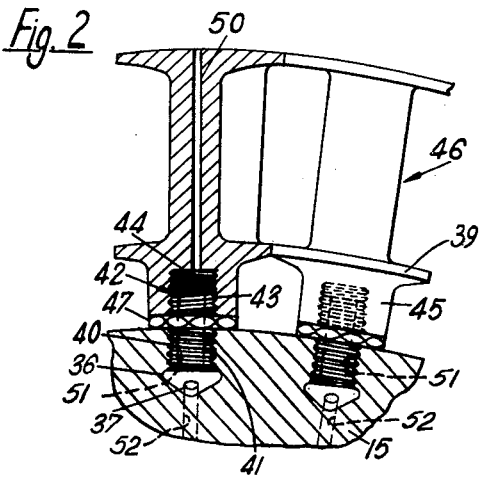
Inventor
James Alexander Petrie
By
Cushman, Darby & Cushman
Attorneys

United States Patent Office 3,219,314
Patented Nov. 23, 1965

3,219,314
BLADE ASSEMBLIES FOR FLUID
FLOW MACHINES
James Alexander Petrie, Derby, England, assignor to
Rolls-Royce Limited, Derby, England, a British company
Filed Feb. 16, 1965, Ser. No. 433,098
Claims priority, application Great Britain, Feb. 26, 1962,
7,495/62
10 Claims. (Cl. 253—39.15)

This invention concerns blade assemblies such, for example, as turbines for gas turbine engines and is a continuation-in-part of my co-pending application Serial No. 255,276, now abandoned.

The term "blade" as used in this specification is, where the context so permits, to be understood in a wide sense as including blade-like members such as inlet and nozzle guide vanes and as including both rotor and stator blades.

The invention is particularly concerned with the manner in which blades are connected to a blade support member, the present proposal being the use of a threaded connecting member for threadably engaging both a threaded shank of the blades and a threaded bore provided in the blade support member.

The use of threaded connections for blades on a support member has been proposed in, for example, U.S. specification 3,073,569. However, in this prior arrangement, a sleeve which is both internally and externally threaded is employed to connect the externally threaded shank of a blade to the internally threaded bore on a blade support member. Such an arrangement suffers from a grave disadvantage in that the design so limits the diameter of the blade shank that this shank is probably insufficient to provide the desired safety margin of resistance to radial stressing and bending. The diameter of the blade shank is limited by two factors. Firstly, the maximum diameter of the threaded holes in the blade support member is strictly limited by the necessity to have a predetermined thickness of metal between adjacent holes in the support member. Secondly, the wall thickness of the sleeve is determined and fixed by the depth of the inner and outer screw threads and by the fact that this thickness must be such as to provide the necessary strength to resist the radial forces on the sleeve during use. These two requirements so restrict the maximum diameter possible for the shanks of the blades that the design is probably impractical.

According therefore to the present invention there is provided a bladed assembly adapted to form part of a fluid flow machine, and comprising a blade support member, a plurality of angularly spaced apart blades carried by the blade support member, each of aid blades having an internally threaded shank, a plurality of plugs each of which connects a blade to the blade support member, and each of which has axial ends and two externally threaded portions of opposite hand which extend towards respective axial ends of the plug, said portions being threadably connected to the blade support member and to the internally threaded shank of the respective blade, and engageable means on each plug which may be engaged so as to permit the plug to be disconnected simultaneously from the blade support member and from the respective blade.

With this arrangement, the disadvantage associated with the design of U.S. 3,073,569 are overcome and a practical threaded construction of bladed rotor is provided.

Preferably each plug is integrally formed with or is provided with a nut which constitutes the said engagement means.

Each blade preferably has at least one passage therethrough for the flow of a heat exchange fluid, the said passage communicating with a heat exchange fluid conduit extending through the blade support member.

The blade support member is preferably constituted by a turbine rotor disc of a gas turbine engine, the said blades being constituted by the turbine rotor blades thereof.

The invention is illustrated, merely by way of example, in the accompanying drawings, in which:

FIGURE 1 is a diagrammatic side view, partly in section, of a gas turbine engine embodying the present invention, and FIGURE 2 is a broken away view, partly in section, showing part of the structure of FIGURE 1 on a larger scale.

Referring to the drawings, a gas turbine engine 10 adapted for use in aircraft propulsion comprises in flow series a compressor 11, combustion equipment 12, and a turbine 13, the exhaust gases being directed to atmosphere through a jet pipe 14.

The turbine 13 has a rotor disc 15 provided with a plurality of angularly spaced apart bores 36 each of which may be supplied with cooling air through an aperture 37 of a heat exchange fluid conduit 52.

Each bore 36 has a substantially cylindrical internally threaded portion 40 into which is threaded an externally threaded portion 41 of a connector member 42.

Each connector member 42 has a duct 51 therethrough and, thus, is in the form of a hollow plug. The plug or member 42 has an externally threaded portion 43 which is axially spaced from and of opposite hand to the externally threaded portion 41.

A turbine rotor blade 46 having a shank or root 45 with an internally threaded portion 44 and a platform 39 is supported by each connector member or plug 42 on the rotor disc 15. In more detail, the externally threaded portion 43 of each connector member 42 is screwed into the internally threaded portion 44 of the shank 45 of blade 46. When all of the blades 46 are assembled on the turbine disc 15, the platform of adjacent blades will abut as shown in FIGURE 2.

Each connector member 42 is integrally formed with a nut 47 which is disposed between the externally threaded portions 41, 43. Each nut 47 may be engaged so as to screw the respective connector member 42 simultaneously into the rotor disc 15 and into the respective blade 46 until the parts are as shown in FIGURE 2, when the nut 47 will abut both the end of the shank 45 of blade 46 and the rotor disc 15 so as to space the blade 46 from the rotor disc 15.

Each internally threaded portion 44 of the shank 45 may communicate with three cooling air passages 50 (only one shown) which extend through the respective blade 46. When the blade 46 is installed on the rotor disc 15, the passages 50 in the blade connect through the duct 51 in plug 42 with the conduit 52 and, thus, cooling air will flow from apertures 37 of conduits 52 through the ducts 51 in plugs 42 to and through passages 50.

It will be appreciated that by supplying cooling air to the blades 46 in this manner, there will be no leakage of cooling air between the platforms 39.

In the constructions shown in the drawings, the connector members 42 serve to space the blades 46 from the rotor disc 15 and therefore reduce the amount of heat which would otherwise be transmitted from the blades 46 to the rotor disc 15.

Compared with the construction of U.S. 3,073,569, the present construction is much stronger. Thus there is still the requirement for a certain dimension of metal between the threaded portions 40 of the rotor disc 15, but because these portions are not internally apertured to receive the blade root they are correspondingly stronger. The radially outer threaded portions 43 of the connector member or plug 42 are limited only in diameter by the spacing of the blades. Correspondingly, the cross-section of metal in the root 45 available to withstand radial stressing during operation is not limited except within the circumferential dimensions of the platform of the blade, although once again there would be no point in making the root 45 stronger than any other part of the interconnecting arrangement according to the invention.

I claim:

1. A blade assembly adapted to form part of a fluid flow machine, and comprising a blade support member, a plurality of angularly spaced apart blades carried by the blade support member, each of said blades having an internally threaded shank, a plurality of plugs each of which connects a blade to the blade support member, and each of which has axial ends and two externally threaded portions of opposite hand which extend towards respective axial ends of the plug, said portions being threadably connected to the blade support member and to the internally threaded shank of the respective blade, and means on each plug intermediate said threaded portions and abutting substantially the entire area of the end of the shank of said blade and also abutting said support member, said abutting means being engageable for rotating said plug so as to permit the plug to be disconnected simultaneously from the blade support member and from the respective blade.

2. A blade assembly adapted to form part of a fluid flow machine, and comprising: a blade support member, a plurality of angularly spaced apart blades carried by the blade support member, each of said blades having an internally threaded shank, a plurality of plugs each of which connects a blade to the blade support member and each of which has two axially spaced externally threaded portions of opposite hand which are respectively threadedly connected to the blade support member and the internally threaded shank of the respective blade, and a nut on each plug intermediate the threaded portions thereof, said nut abutting the end of the shank of said blade and said support member so as to space the respective blade from the support member, and said nut having a surface area which abuts the end of the shank substantially as great as the area of the end shank.

3. A blade assembly adapted to form part of a fluid flow machine, and comprising a blade support member having a plurality of heat exchange fluid conduits extending therethrough, a plurality of angularly spaced apart blades carried by said blade support member, each of said blades having an internally threaded shank and at least one passage therethrough, a plurality of plugs each of which connects a blade to the blade support member, each of said plugs having two axially spaced externally threaded portions of opposite hand which are respectively threadedly connected to the blade support member and to the internally threaded shank of the respective blade and each of said plugs having a duct therethrough connecting one of said conduits to the passage in the respective blade, means on each plug intermediate said threaded portions for abutting both the end of the shank of said blade and said support member so as to space the end of the shank of the blade from the support member and for permitting the plug to be engaged and rotated for connecting or disconnecting the plug from the blade support member and from the respective blade.

4. A blade assembly as claimed in claim 3 in which each of said blades includes a platform spaced from the end of the shank, the platform of one blade abutting the platform of an adjacent blade when the blades are carried by said support member.

5. A blade assembly adapted to form part of a fluid flow machine and comprising: a blade support member having a plurality of heat exchange conduits extending therethrough, a plurality of spaced apart blades carried by the blade support member, each of said blades having an internally threaded shank and at least one passage therethrough, a plurality of plugs each of which connects a blade to the blade support member and each of which has two axially spaced externally threaded portions of opposite hand which are respectively threadedly connected to the blade support member and to the internally threaded shank of the respective blade, and each of said plugs having a duct therethrough connecting one of said conduits to the passage in the respective blade, and a nut on each plug intermediate said threaded portions which may be engaged so as to threadedly connect or disconnect the plug from the blade support member and from the respective blade, said nut abutting the end of the shank of said blade and said blade support member and having a surface area substanitally equal to the area of the end of the said shank.

6. A blade assembly as claimed in claim 5 in which each blade includes a platform, the platform of one blade abutting the platform of an adjacent blade when the blades are carried by the blade support member.

7. A turbine comprising a turbine disc, a plurality of angularly spaced apart turbine blades carried by the turbine disc, each of said blades having an internally threaded shank, a plurality of plugs each of which connects a blade to the turbine disc and each of which has two externally threaded portions of opposite hand which are respectively threadably connected to the turbine disc and to the internally threaded shank of the respective blade, and means on each plug intermediate said externally threaded portions thereof and abutting substantially the entire area of the end of the shank of said blade and also abutting said turbine disc so as to space the end of the shank of the blade from the turbine disc, said abutting means being engageable to threadably connect or disconnect the plug from the turbine disc and from the respective blade.

8. A turbine as claimed in claim 7 in which said turbine disc includes heat exchange fluid conduit means, and in which each of said blades has at least one passage therethrough, and means for connecting the passage in each of said blades with the heat exchange fluid conduit means, said last mentioned means including a duct extending axially through each of said plugs, each duct communicating between the passages in the respective blade and the turbine disc.

9. A turbine as claimed in claim 7 in which each of said blades includes a platform thereon spaced from the end of the shank, the platform of one blade abutting the platform of an adjacent blade when the blades are carried by said turbine disc.

10. A turbine comprising a turbine disc having heat exchange fluid conduit means therein, a plurality of angularly spaced apart turbine blades carried by said turbine disc, each of said blades having an internally threaded shank and at least one passage therethrough, a plurality of plugs each connecting a blade to the blade support member and each of which has two axially spaced externally threaded portions of opposite hand which are respectively threadedly connected to the blade support member and to the internally threaded shank of the respective blade, and each of said plugs having a duct therethrough connecting said conduit means to the passage in the respective blade, and means on each plug intermediate said threaded portions for abutting both the end of the shank of said blade and said turbine disc so as to space the end of the blade from the turbine disc and for permitting the plug to be engaged and rotated for connecting or disconnecting the plug from the turbine disc and from the respective blade.

References Cited by the Examiner

UNITED STATES PATENTS

| | | |
|---|---|---|
| 509,458 | 11/1893 | Still. |
| 925,030 | 6/1909 | Russel _____ 170—160.6 |
| 932,744 | 8/1909 | Adams. |
| 2,047,776 | 7/1936 | Hafner _____ 170—160.62 X |
| 2,552,118 | 5/1951 | Sawyer. |
| 2,703,724 | 3/1955 | Yuen et al. _____ 287—127 |
| 3,073,569 | 1/1963 | Wagner _____ 253—77 |

FOREIGN PATENTS

| | | |
|---|---|---|
| 410,431 | 2/1925 | Germany. |
| 3,285 | 1867 | Great Britain. |
| 591,570 | 8/1947 | Great Britain. |

SAMUEL LEVINE, *Primary Examiner.*